(12) United States Patent
Coronado

(10) Patent No.: US 7,628,543 B2
(45) Date of Patent: Dec. 8, 2009

(54) DOWNHOLE OPTIC FIBER WET CONNECT SYSTEM AND METHOD

(75) Inventor: Martin P. Coronado, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/955,043

(22) Filed: Dec. 12, 2007

(65) Prior Publication Data

US 2008/0095500 A1    Apr. 24, 2008

Related U.S. Application Data

(62) Division of application No. 11/717,449, filed on Mar. 13, 2007, now Pat. No. 7,509,900.

(60) Provisional application No. 60/783,884, filed on Mar. 20, 2006.

(51) Int. Cl.
*G02B 6/36* (2006.01)
*G02B 6/34* (2006.01)
*G02B 6/26* (2006.01)

(52) U.S. Cl. .............................. 385/53; 385/37; 385/52

(58) Field of Classification Search .................. 385/53, 385/37, 52
See application file for complete search history.

(56) References Cited

U.S. PATENT DOCUMENTS

| | | | | |
|---|---|---|---|---|
| 3,948,582 A | * | 4/1976 | Martin | ........................ 385/56 |
| 4,146,299 A | * | 3/1979 | Wellington et al. | ........... 385/59 |
| 4,353,620 A | * | 10/1982 | Schultz | ........................ 385/70 |
| 4,544,233 A | | 10/1985 | Iwamoto et al. | |
| 4,616,900 A | * | 10/1986 | Cairns | ........................ 385/73 |
| 4,666,242 A | | 5/1987 | Cairns | |

(Continued)

FOREIGN PATENT DOCUMENTS

JP      57053715 A      9/1980

(Continued)

OTHER PUBLICATIONS

Restarick, Henry. Halliburton Energy Services. "Horizontal Completion Options In Reservoirs With Sand Problems". SPE 29831. Mar. 1995. pp. 545-560.
International Search Report, Mailed Sep. 24, 2007, 3 Pages.

*Primary Examiner*—K Cyrus Kiannii
(74) *Attorney, Agent, or Firm*—Cantor Colburn LLP

(57) ABSTRACT

A downhole optic fiber wet-connect system includes first and second matable portions of a tool body; first and second matable portions of a connector. Further included is a first magnet associated with one of the first and second matable portions and a second magnet associated with the other of the first and second matable portions, the first and second magnets being oriented to attract one another; a first opening in one of the first and second matable portions of the tool body; a second opening in the other of the first and second matable portions of the tool body; and at least one of the first and second openings in the first and second matable portions of the tool body configured and dimensioned to loosely receive one of the first and second matable portions of the connector therein and a method for wet-connecting an optic fiber in a downhole environment.

4 Claims, 6 Drawing Sheets

U.S. PATENT DOCUMENTS

| | | | | |
|---|---|---|---|---|
| 4,682,848 A * | 7/1987 | Cairns et al. | ............... | 385/69 |
| 4,690,495 A * | 9/1987 | Giannini | ............... | 385/57 |
| 4,844,582 A | 7/1989 | Giannini | | |
| 5,015,061 A * | 5/1991 | Giannini | ............... | 385/56 |
| 5,033,808 A | 7/1991 | Smith et al. | | |
| 5,401,175 A * | 3/1995 | Guimond et al. | ............... | 439/38 |
| 5,645,438 A * | 7/1997 | Cairns | ............... | 439/139 |
| 5,738,535 A | 4/1998 | Cairns | | |
| 5,999,671 A * | 12/1999 | Jin et al. | ............... | 385/37 |
| 6,196,553 B1 * | 3/2001 | Arab-Sadeghabadi et al. | ............... | 277/603 |
| 6,315,461 B1 * | 11/2001 | Cairns | ............... | 385/56 |
| 6,332,787 B1 | 12/2001 | Barlow et al. | | |
| 6,464,408 B1 * | 10/2002 | Nolan | ............... | 385/87 |
| 6,511,335 B1 | 1/2003 | Rayssiguier et al. | | |
| 6,702,478 B2 | 3/2004 | Inagaki et al. | | |
| 6,910,910 B2 * | 6/2005 | Cairns | ............... | 439/352 |
| 6,957,351 B2 * | 10/2005 | Emberty et al. | ............... | 713/300 |
| 7,040,909 B2 * | 5/2006 | Cairns | ............... | 439/271 |
| 2003/0009700 A1 * | 1/2003 | Emberty et al. | ............... | 713/300 |
| 2003/0035917 A1 * | 2/2003 | Hyman | ............... | 428/67 |
| 2003/0107652 A1 * | 6/2003 | Williams | ............... | 348/207.99 |
| 2003/0147596 A1 | 8/2003 | Lancelle | | |
| 2004/0028342 A1 | 2/2004 | Jones et al. | | |
| 2004/0151464 A1 * | 8/2004 | Marrs | ............... | 385/134 |
| 2005/0037656 A1 * | 2/2005 | Cairns | ............... | 439/353 |
| 2005/0074210 A1 | 4/2005 | Grigsby et al. | | |
| 2005/0136722 A1 * | 6/2005 | Cairns | ............... | 439/271 |
| 2005/0207708 A1 | 9/2005 | Wittrisch | | |
| 2005/0211441 A1 | 9/2005 | Vold et al. | | |
| 2006/0188254 A1 * | 8/2006 | Schorpp | ............... | 398/33 |
| 2007/0122079 A1 * | 5/2007 | Drabarek et al. | ............... | 385/39 |
| 2007/0218775 A1 * | 9/2007 | Coronado | ............... | 439/681 |

FOREIGN PATENT DOCUMENTS

| | | |
|---|---|---|
| WO | 0217440 A2 | 2/2002 |
| WO | 2007109494 A2 | 9/2007 |

\* cited by examiner

DOWNHOLE OPTIC FIBER WET CONNECT SYSTEM AND METHOD

CROSS REFERENCE TO RELATED APPLICATIONS

This application is a division of U.S. application Ser. No. 11/717,449, filed Mar. 13, 2007 now U.S. Pat. No. 7,509,000, and it further claims the benefit of Provisional Application No. 60/783,884, filed Mar. 20, 2006, the entire contents of which are incorporated herein by reference.

BACKGROUND

In the hydrocarbon exploration and recovery arts it is increasingly common to see monitoring and/or control type devices in the downhole environment that require signal bearing connections to remote controllers, including surface controllers. Because downhole systems are generally built in pieces this necessitates the connection of signal conveying conduits while in the downhole environment, which often will be a dirty and wet environment. Dirty, wet environments in which connectors are intended to both mate and function, makes for challenges with respect to the connectors themselves. Careful consideration is necessary to prepare proper connections. In addition, since connections are often made several miles distant from the well operator, consideration with respect to alignment and mechanical forces is necessary. Because of these issues the types of connections that can be made in the downhole environment have been relatively limited and generally are costly to produce.

SUMMARY

Disclosed herein is a downhole optic fiber wet-connect system. The system includes first and second matable portions of a tool body; first and second matable portions of a connector body. Further included is a first magnet associated with one of the first and second matable portions and a second magnet associated with the other of the first and second matable portions, the first and second magnets being oriented to attract one another; a first opening in one of the first and second matable portions of the tool body; a second opening in the other of the first and second matable portions of the tool body; and at least one of the first and second openings in the first and second matable portions of the tool body being configured and dimensioned to loosely receive one of the first and second matable portions of the connector body therein.

Further disclosed herein is a method for wet-connecting an optic fiber in a downhole environment. The method includes supporting one of a first and second portion of a connector body with a flex-support within an opening of a first portion of a tool body, the opening loosely receiving the connector body portion; moving the other of the first and second portions of the connector, the other portion being located within a second portion of the tool body, into mating contact with the one of the first and second portions; and buckling the flex-support to decouple a mechanical load on the connector from the mating of the first and second portions of the tool body.

DETAILED DESCRIPTION OF THE DRAWINGS

Figure 1:
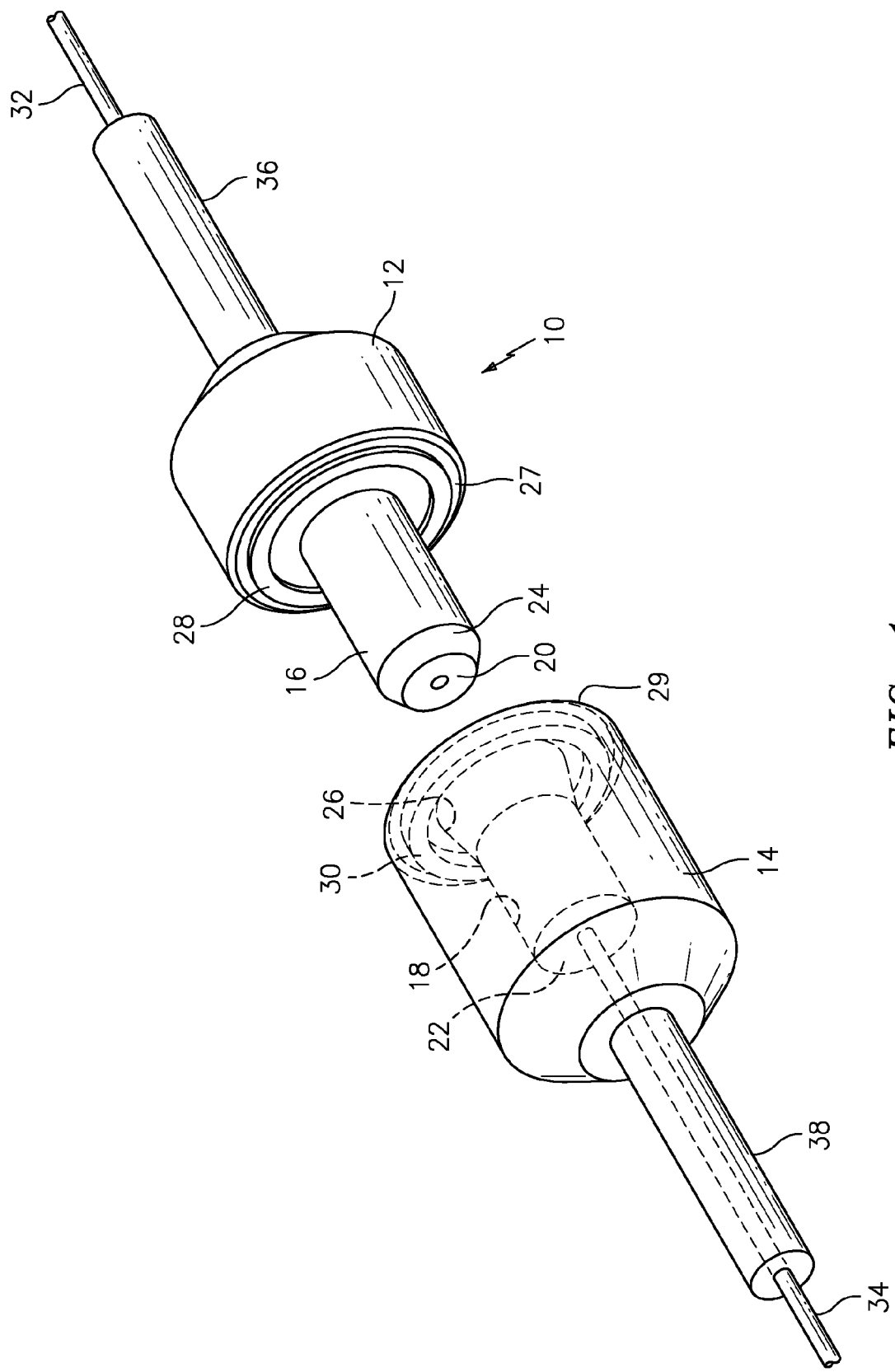
FIG. 1 is a perspective illustration of male and female portions of a connector body in an exploded relationship to one another.
Figure 2:
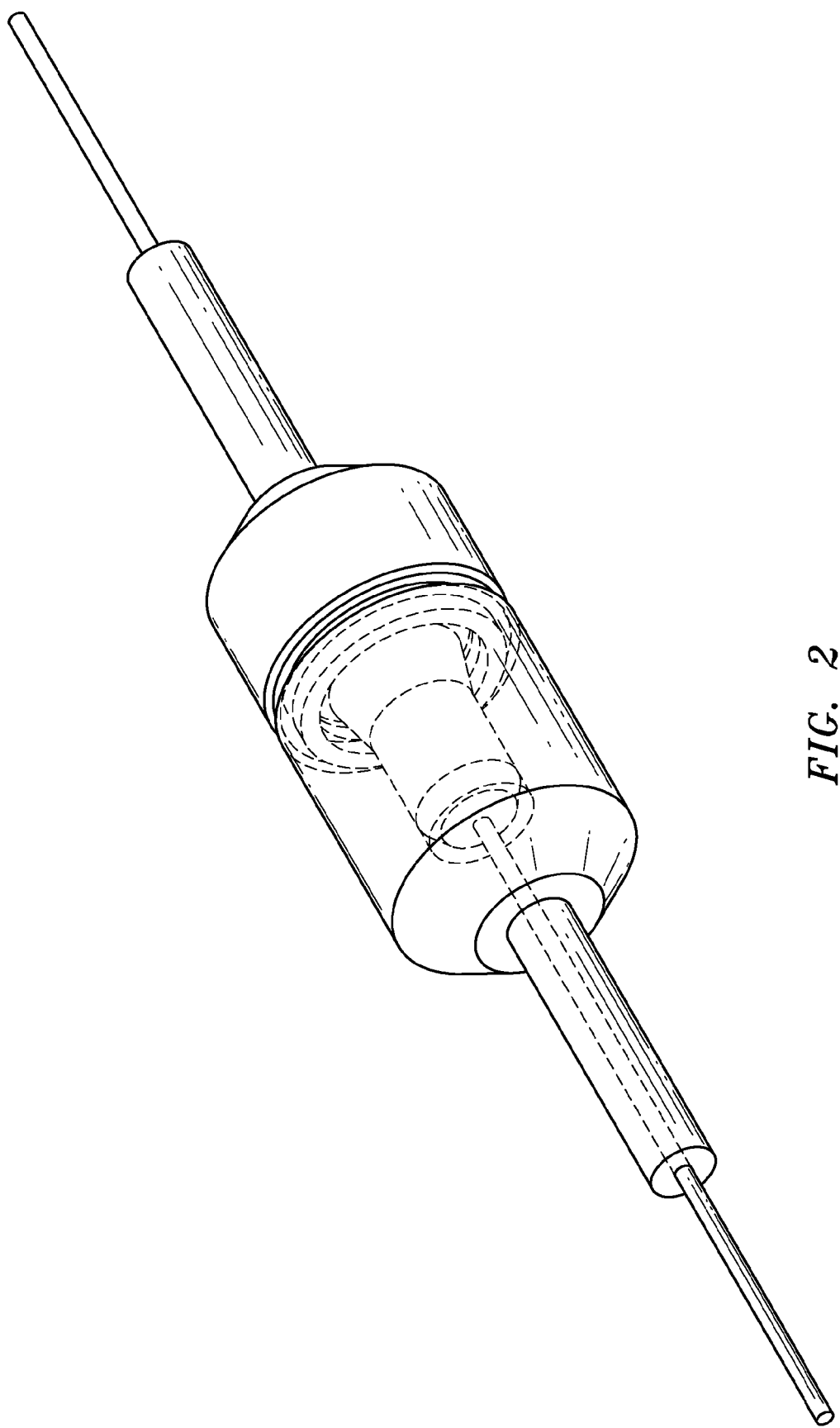
FIG. 2 illustrates in partial phantom the components of FIG. 1 in a mated condition.

Referring to FIG. 1, a connector body 10 is illustrated having a male portion 12 and a female portion 14. The portions are illustrated as cylindrical bodies but it will be understood that any geometrical shape is acceptable. Male portion 12 includes a projection 16 that is receivable in relatively tight communication with a recess 18 in female portion 14. A depth dimension of recess 18 is to be selected to simply ensure a reliable optical interface. Male projection 16 includes an optical fiber face 20 which is intended to rest in close proximity, or in one embodiment in physical contact, to a female optical fiber face 22 when the first portion 12 and second portion 14, are mated, thus a length of the male projection is to be appropriate to the depth dimension of the recess 18. Each of the lengths noted are measured from a shoulder 27 and a shoulder 29 of male portion 12 and female portion 14, respectively.

To aid in alignment of male portion 12 and female portion 14 during mating of the connector body 10, projection 16 includes a beveled edge 24 which may communicate with a frustoconical surface 26 in female portion 14 to urge at least one of the male portion 12 and the female portion 14 into a better aligned position with respect to the other of the male portion 12 and female portion 14. It is also quite possible that both male portion 12 and female portion 14 will move relative to one another upon intersection of beveled edge 24 and frustoconical surface 26. The phrase "may communicate" has been used here because it is also serendipitously possible that the male and female portions will align without contact between the beveled edge 24 and surface 26. Upon initial alignment of the male portion 12 and female 14 due to interaction between beveled edge 24 and frustoconical surface 26 as well as the male projection 16 and the female recess 18, a magnetic interaction is utilized to assist the mating process. A magnet 28 on the male portion 12 and a magnet 30 on the female portion 14, are arranged so as to be attracted to one another. The magnets 28 and 30 will assist in alignment and additionally function to pull the male portion 12 and the female portion 14 of the connector body 10 into fully mated engagement. Magnets 28 and 30 may be of annular form as illustrated or may be in other geometric shapes. Further magnets 28 and 30 may be substituted for by a plurality of magnets in the stead of each or both of them. Once the magnets 28 and 30 have come into proximity with one another during mating of the connector body 10, the attractive force tends to hold portions 12 and 14 of the connector body 10 together.

Figure 4:
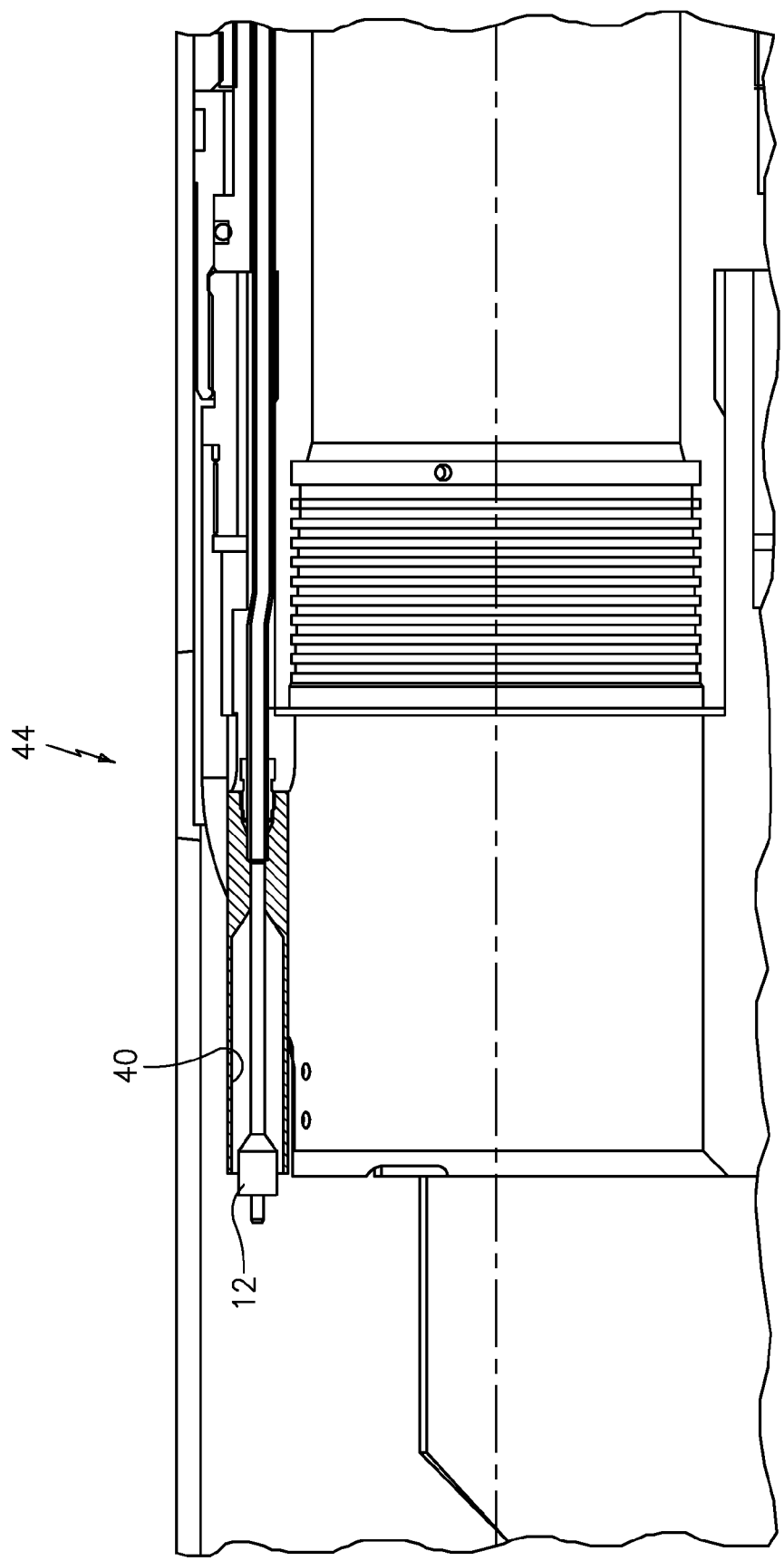
FIG. 4 is a schematic illustration of a portion of the tool body having the male portion of the connector body disposed therein and supported by a flex-support.
Figure 5:
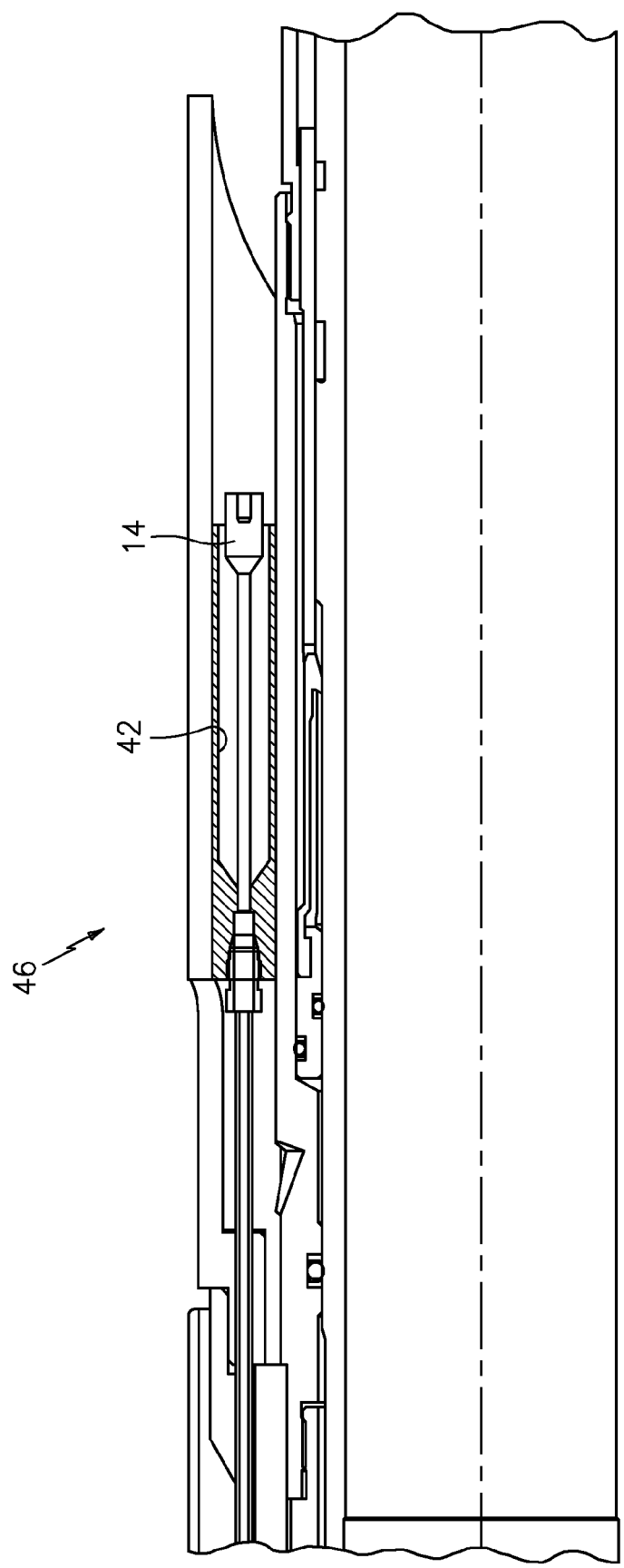
FIG. 5 is a schematic illustration of a portion of the tool body having the female portion of the connector body disposed therein and supported by a flex-support.
Figure 6:
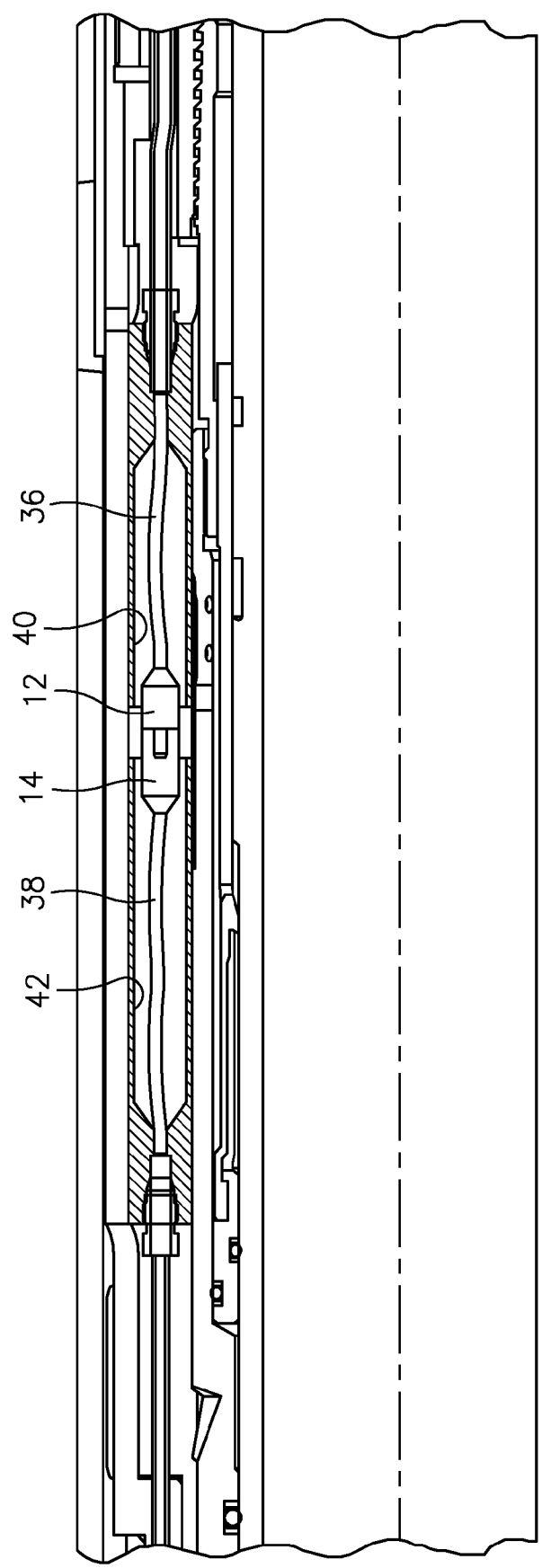
FIG. 6 is a schematic illustration of the illustrations of FIGS. 4 and 5 in a connected configuration.

Still referring to FIG. 1, an optical fiber segment 32 is illustrated extending from the male portion 12 and an optical fiber segment 34 is illustrated extending from the female portion 14. Disposed at optical fiber segments 32 and 34 are flex-support 36 and flex-support 38, respectively. The flex-supports have for their purpose to support, respectively, the male portion 12 and female portion 14 of connector body 10 in a desired location within a tool body discussed hereinunder with reference to FIGS. 4-6. It is noted that drawing FIGS. 4-6 depict the configuration disclosed herein within otherwise commercially available tools from Baker Oil Tools under product number H488-75 and H444-75, referring to a packer and reconnect anchor respectively. The components of these tools are not germane to the invention and are therefore not described in detail). The flex-support 38, for example, will have sufficient stiffness to hold female portion 14 of the connector body in a relatively stationary position providing no significant additional load is placed upon female portion 14 of connector body 10. The stiffness of support 38 is selected to be insufficient to maintain a position of female portion 14 when any significant load is placed thereon. In such event, flex-support 38 will buckle in one or more of a number of ways calculated to be such that the optic fiber 34 therein is not damaged. Such calculated ways include bending in a helical pattern, in a gentle bow pattern, and other patterns which facilitate smooth large radius bends in the optic fiber rather than sharp bends thereof, which tend to degrade performance of the fiber. Further with respect to stiffness, it is intended that the stiffness of flex-support 36 or 38 also be such that they will hold the connector portions in place when there is no outside force acting thereon and yet the connector portions can be moved about during alignment of portion 12 and portion 14 to effectively yield their positions to external forces. Flex-supports 36 and 38 therefore secure the triple purpose of supporting the connector portion in place, flexing to allow alignment thereof and decoupling mechanical load in the connector. It is to be understood that either or both of the flex-supports illustrated may have these properties. Greater flexibility is achievable with flex-supports having these properties when supporting both the male portion 12 and the female portion 14 as is illustrated in FIGS. 4-6. With both portions flexibly supported a greater degree of movement of the connector body is possible. The flex-support decoupling concept is important because the connector body portions 12 and 14 must mate prior to the tool body portions mating lest the connector body portions not fully mate. Because of such arrangement rigidly mounted connector bodies would be subject to whatever load is inherent in the mating of the tool body portions after the connector body is fully mated. This would require that the connector body be significantly more robust to support those loads thereby rendering such connector significantly more expensive to produce and subject to a shorter life expectancy as wellbore conditions such as jars and vibrations would be strongly coupled to the connector if not for the configuration disclosed herein. Because the flex-support(s) 36 and 38 allow for movement of the connector body portions 12 and 14 yet support them, the connector body portions are mountable in loosely receiving openings 40 and 42, respectively in the tool body portions 44 and 46, respectively (see FIGS. 4-6). This allows for the connector body portion 14 or 12 to have a greater degree of freedom than it would otherwise have within the tool body portion 44 if the receiving opening 40 were closely tolerant to the connector body. Multiple degrees of freedom are provided by the flex-support 38 and/or 36. In FIG. 6 it can be visually appreciated that there is a bow in the flex-supports 36 and 38 for illustrative purposes. It is important to appreciate that flex-support 36, flex-support 38, or both 36 and 38 may be utilized in any particular application. Providing that at least one portion of the connector body 10 is supported by a flex-support, and not otherwise hard mounted in the tool body, the benefits of the arrangement set forth herein are achieved.

Figure 3:
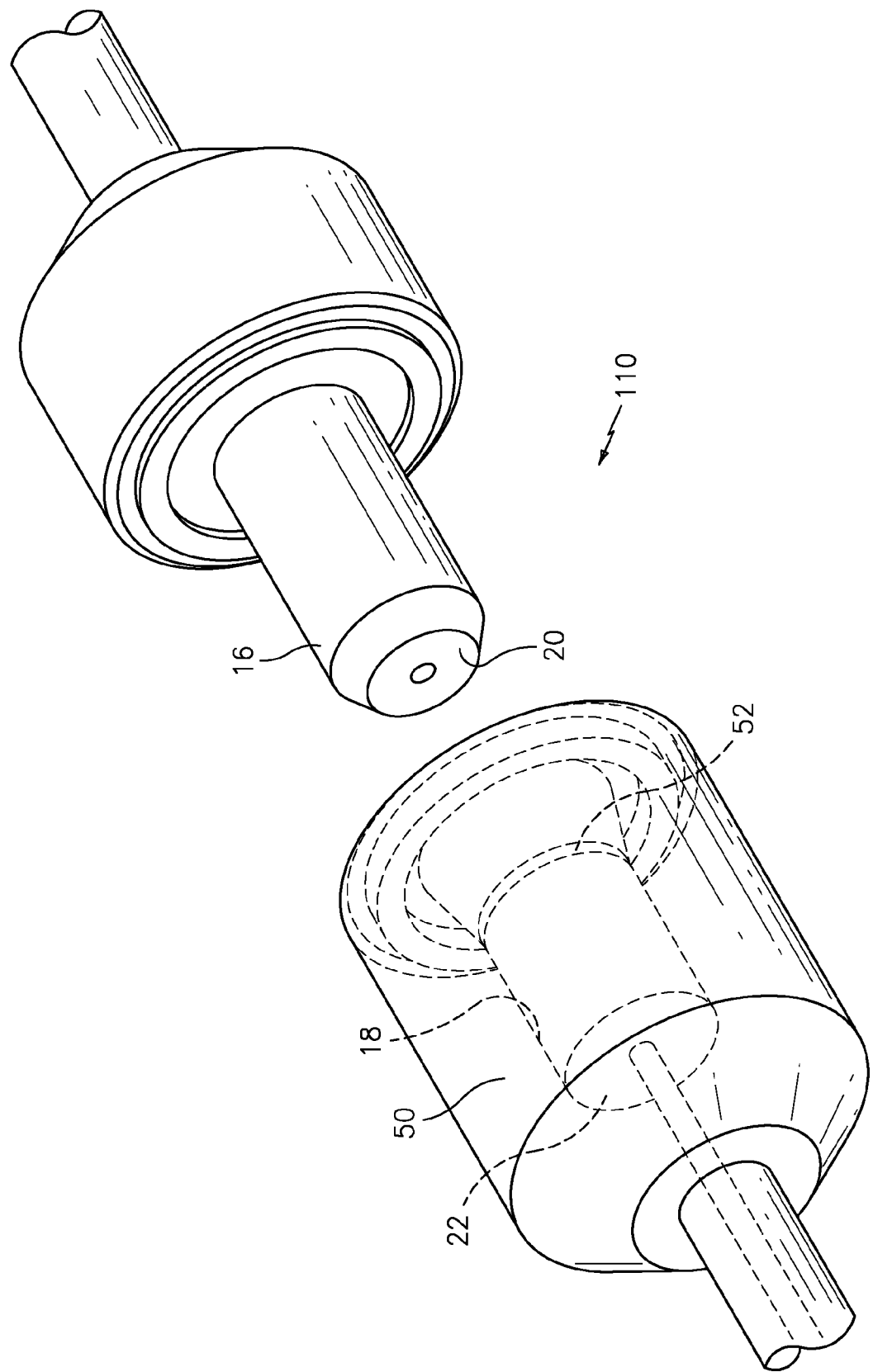
FIG. 3 illustrates an alternate embodiment of a connector body wherein a clean fluid and containment member are illustrated.

In an alternate embodiment of the connector body 110, and referring to FIG. 3, a clean fluid 50 is contained within recess 18 by a containment member 52. The containment member is openable upon approach of male projection 16 or indeed by contact of face 20 of male projection 16 with the member 52, in the event that member 52 is a rupturable membrane. This embodiment allows the connector body 10 to flush itself of any contaminants that otherwise might nestle themselves between face 20 and face 22 thereby impeding optical transmission from fiber section 32 to fiber section 34 or vice versa. Upon opening of member 52, clean fluid 50, which may be, for example, a hydraulic fluid or index matching gel or other optically compatible fluid, is forced to move between the interstitial relatively annular space defined between male projection 16 and recess 18. Pressure for the expulsion of such fluid is generated by the advance of projection 16 into the recess 18. The clean fluid displaces contaminants that might otherwise impede optical transmission. In other respects this embodiment is similar to the foregoing embodiment.

The invention claimed is:

1. A method for wet-connecting an optic fiber in a downhole environment comprising:
   supporting one of a first and second portion of a connector body with a flex-support within an opening of a first portion of a tool body, the opening loosely receiving the one of the first and second portion of the connector body;
   moving the other of the first and second portion of the connector body, the other portion of the connector body being located within a second portion of the tool body, into mating contact with the one of the first and second portion of the connector body in the downhole environment;
   buckling the flex-support to decouple a mechanical load on the connector from the mating of the first and second portions of the tool body.

2. The method for wet-connecting an optic fiber in a downhole environment as claimed in claim 1 wherein the moving includes aligning the first and second portions of the connector body.

3. The method for wet-connecting an optic fiber in a downhole environment as claimed in claim 1 wherein the mating includes opening of a clean fluid volume thereby flushing a connection area of the connector body.

4. The method for wet-connecting an optic fiber in a downhole environment as claimed in claim 3 wherein the opening is rupturing of a containment member.

* * * * *